United States Patent [19]
Cleall et al.

[11] Patent Number: 5,653,494
[45] Date of Patent: Aug. 5, 1997

[54] MODULAR SPORT, WORK, AND TRAVEL TRAILER SYSTEM

[75] Inventors: Christopher C. Cleall, Saskatoon, Switzerland; Edmund K. Maier, Penfield, N.Y.

[73] Assignee: TransMaster Technologies Inc., Saskatchewan, Canada

[21] Appl. No.: 268,306

[22] Filed: Jun. 29, 1994

[51] Int. Cl.⁶ ........................................ B62D 23/00
[52] U.S. Cl. .................. 296/182; 280/8; 280/19.1; 280/414.2; 296/29; 296/196; 296/901
[58] Field of Search .................. 296/168, 181, 296/182, 183, 196, 197, 901, 37.1, 208, 38, 29, 203; 280/414.1, 414.2, 19.1, 8, 9; 114/43; 135/901

[56] References Cited

U.S. PATENT DOCUMENTS

| | | | |
|---|---|---|---|
| 1,959,523 | 5/1934 | Chelbowski | 114/43 |
| 2,883,233 | 4/1959 | Beckley | 296/181 |
| 3,017,194 | 1/1962 | Anderson | 280/19.1 X |
| 3,528,095 | 9/1970 | Gudmundson | 280/414.1 |
| 3,594,825 | 7/1971 | Reid | 4/2 |
| 3,623,744 | 11/1971 | Bertness et al. | 296/203 X |
| 3,731,831 | 5/1973 | Huff | 296/37.1 X |
| 3,739,536 | 6/1973 | Ward | 135/901 X |
| 3,971,395 | 7/1976 | Lipinski | 280/19.1 |
| 4,384,663 | 5/1983 | Smith-Williams | 296/37.1 X |
| 5,277,141 | 1/1994 | Csepregi | 114/43 |
| 5,287,813 | 2/1994 | Hanni et al. | 296/29 X |
| 5,314,200 | 5/1994 | Phillips | 296/181 X |

FOREIGN PATENT DOCUMENTS 1800776  10/1970  Germany ................ 296/203

*Primary Examiner*—David M. Mitchell
*Assistant Examiner*—Kia M. Robinson
*Attorney, Agent, or Firm*—Howard J. Greenwald

[57] ABSTRACT

A sports trailer system comprised of a first removable module, a second removable module, an integrally molded frame shaped and adapted for the nesting of the first removable module and the second removable module within the frame, and a substantially flat floor surface contiguous with the integrally molded frame. The frame contains at least 90 weight percent of nonmetallic material and is an integral, continuous structure comprised of at least three structural cross-member elements and at least two structural longitudinal structural elements.

15 Claims, 8 Drawing Sheets

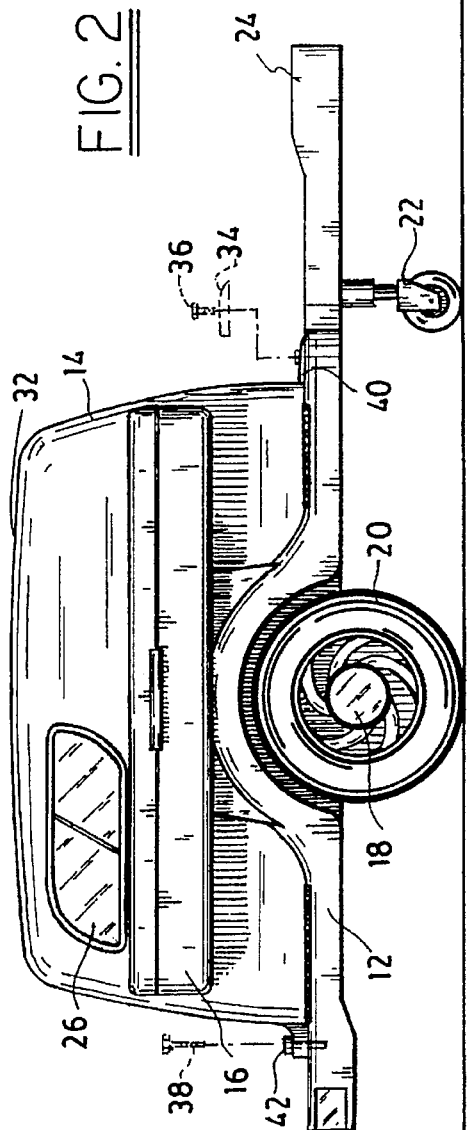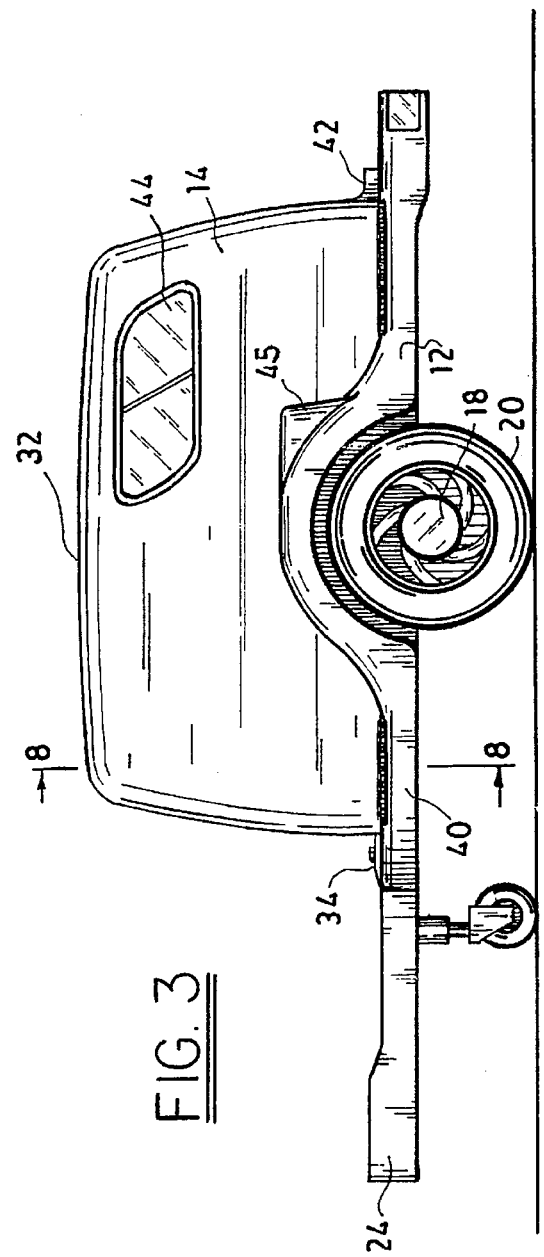

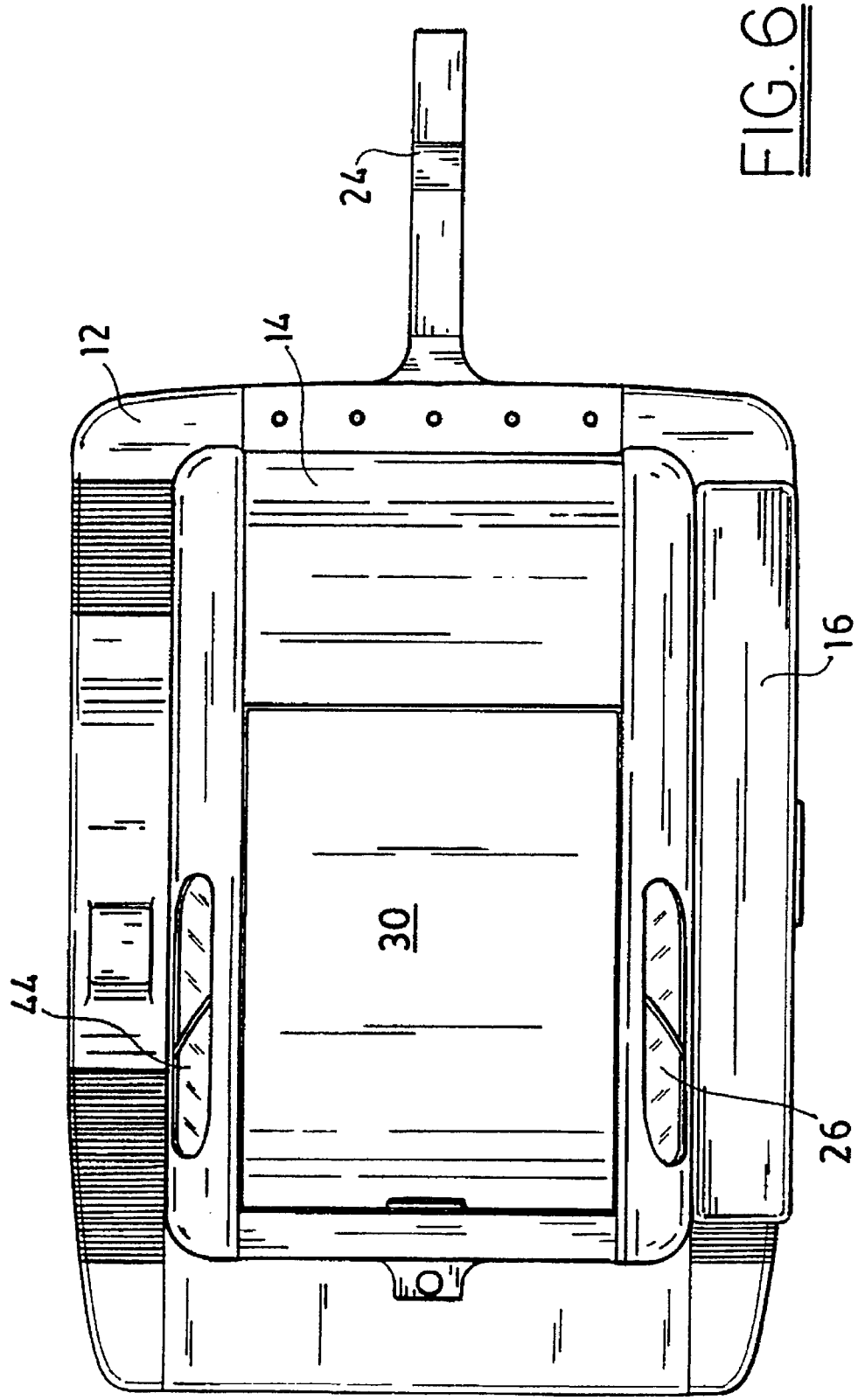

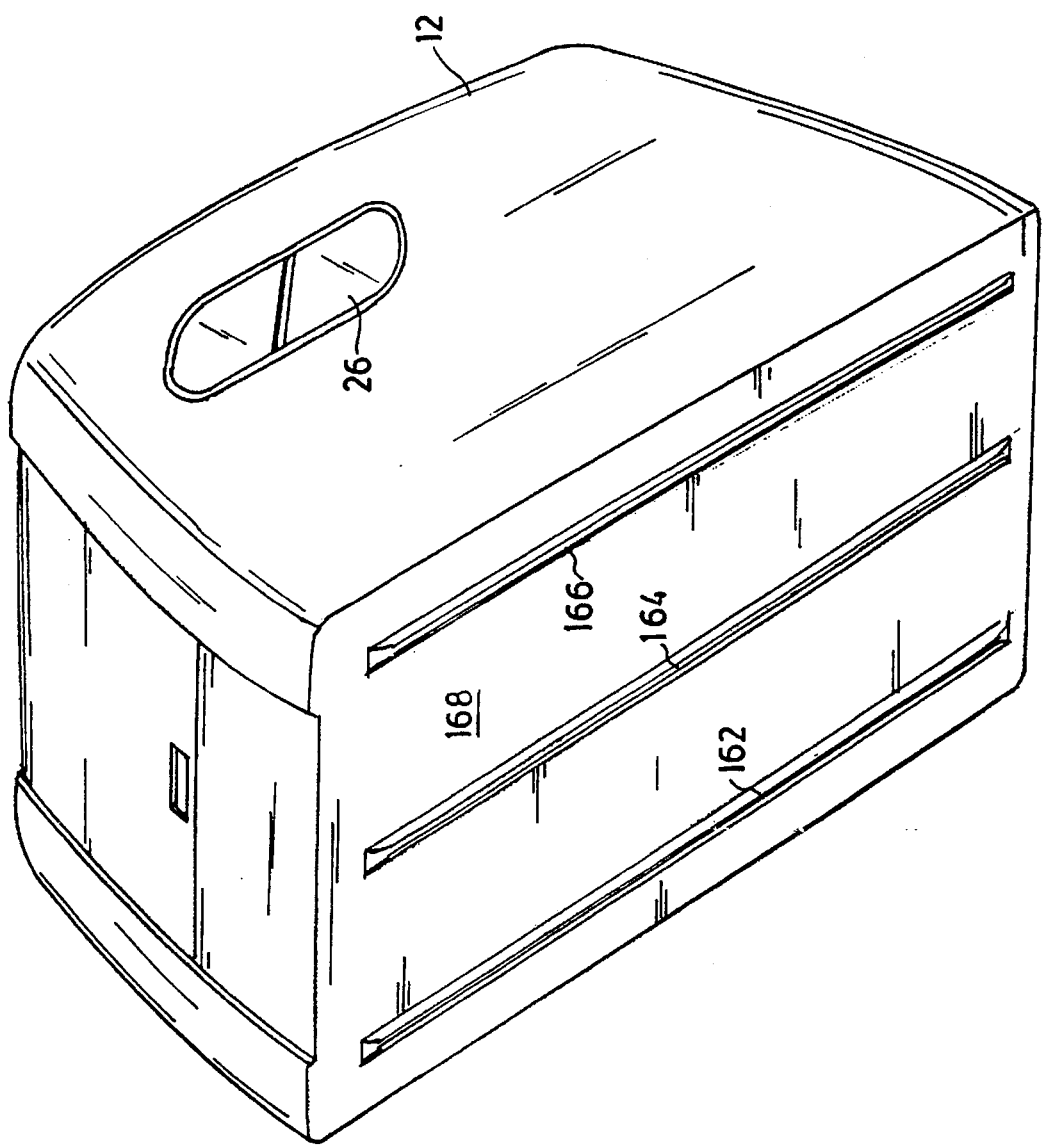

MODULAR SPORT, WORK, AND TRAVEL TRAILER SYSTEM

FIELD OF THE INVENTION

A modular utility trailer system comprised of an integrally-molded frame is disclosed. The system contains several modules which may be removably attached to the frame.

BACKGROUND OF THE INVENTION

Trailers which are primarily intended for use by sportsmen for camping, hunting, and fishing are well known to those skilled in the art. None of them, however, offers a combination of strength, low weight, and versatility which is desirable in such a sports trailer.

Thus, in his U.S. Pat. No. 2,894,783, Walter Bird teaches that ". . . camping trailers presently manufactured are generally of aluminum and/or plywood construction, and are characterized by the presence of a very large number of joints, reinforcing elements, etc. Such trailers are relatively heavy and, because they are normally double-walled, have relatively little interior room . . ." Since 1959, when Bird's patent issued, many trailers have been provided which are made of fiberglass rather than aluminum or plywood; however, inasmuch as these trailers also have double-walled construction, they suffer from many of the disadvantages of the older models and, furthermore, still do not offer the usage flexibility desired in today's market environment.

One unsuccessful attempt to solve these problems was disclosed in U.S. Pat. No. 2,907,601 of Kuchenbecker et al. (1959), which describes a trailer vehicle with a combined, unitary, frame and tubular body structure which is formed of corrugated tubular sheet metal. Although the trailer of Kuchenbecker et al. is claimed to be relatively strong and rigid, it also is relatively heavy. The sheet metal body is prone to corrosion. Furthermore, the body of the Kuchenbecker et al. trailer cannot readily be removed or modified without compromising the structural integrity of the trailer.

Another unsuccessful attempt to solve these problems was described in two patents issued to Beckley. In 1959 (U.S. Pat. No. 2,883,233) and 1963 (U.S. Pat. No. 3,084,973) Benton Beckley described a molded shell trailer body containing a main upper body shell section and a main lower body shell section, each of which apparently had hollow walls. Beckley's trailer, however, did not contain a separate frame. Thus, this trailer had a relatively low strength/weight ratio and, furthermore, could not readily be modified for different uses without compromising its structural integrity.

In 1985, U.S. Pat. No. 4,537,441 was issued to Donald J. McCleary for a motorcycle trailer containing a tubular chassis and an integral molded body. The McCleary trailer is designed to enable a user to sleep in and/or transport goods in the trailer; it cannot be modified for different uses, however. Furthermore, it is believed that McCleary's trailer has a relatively low strength/weight ratio.

U.S. Pat. No. 4,781,392 issued to Cooper in 1988. This patent described a molded boat trailer which suffered from many of the disadvantages of the prior art. The strength/weight ratio of this trailer was relatively low, and its structure could not readily be modified to adapt it to different uses or, for that matter, different boat-hull configurations.

To the best of applicants' knowledge, no one in the prior art has provided a sports trailer which is relatively inexpensive to make and use, which is strong, aerodynamic, and lightweight, and which can be used for a multiplicity of purposes.

It is an object of this invention to provide a sports trailer system which may be used for many different purposes such as, e.g., hunting, fishing, camping/sleeping, transport of different material and/or vehicles, and the like.

It is another object of this invention to provide a sports trailer which is both lightweight and strong.

It is yet another object of this invention to provide a modular and transformable sports trailer system offering versatility of use over land and water.

It is yet another object of this invention to provide a sports trailer whose frame is watertight and buoyant and, thus, will not sink in water.

It is another object of this invention to provide a sports trailer which has a shape that provides relatively little wind resistance.

It is yet another object of this invention to provide a sports trailer which is relatively inexpensive to produce.

It is yet another object of this invention to provide a sports trailer which is relatively inexpensive to use and maintain.

It is yet another object of this invention to provide a sports trailer whose ground height can be adjusted.

SUMMARY OF THE INVENTION

In accordance with this invention, there is provided a sports trailer system which contains an integrally molded frame and a multiplicity of modules adapted to nest into and be removably secured to said frame.

BRIEF DESCRIPTION OF THE DRAWINGS

The present invention will be more fully understood by reference to the following detailed description thereof, when read in conjunction with the attached drawings, wherein like reference numerals refer to like elements, and wherein:

FIG. 2 is a right side view of the embodiment of FIG. 1;

FIG. 3 is a left side view of the embodiment of FIG. 1;

FIG. 6 is a top view of the embodiment of FIG. 1;

FIG. 10 is a perspective view of another preferred module which can be used in the sports system of FIG. 1.

DESCRIPTION OF THE PREFERRED EMBODIMENTS

Figure 1:
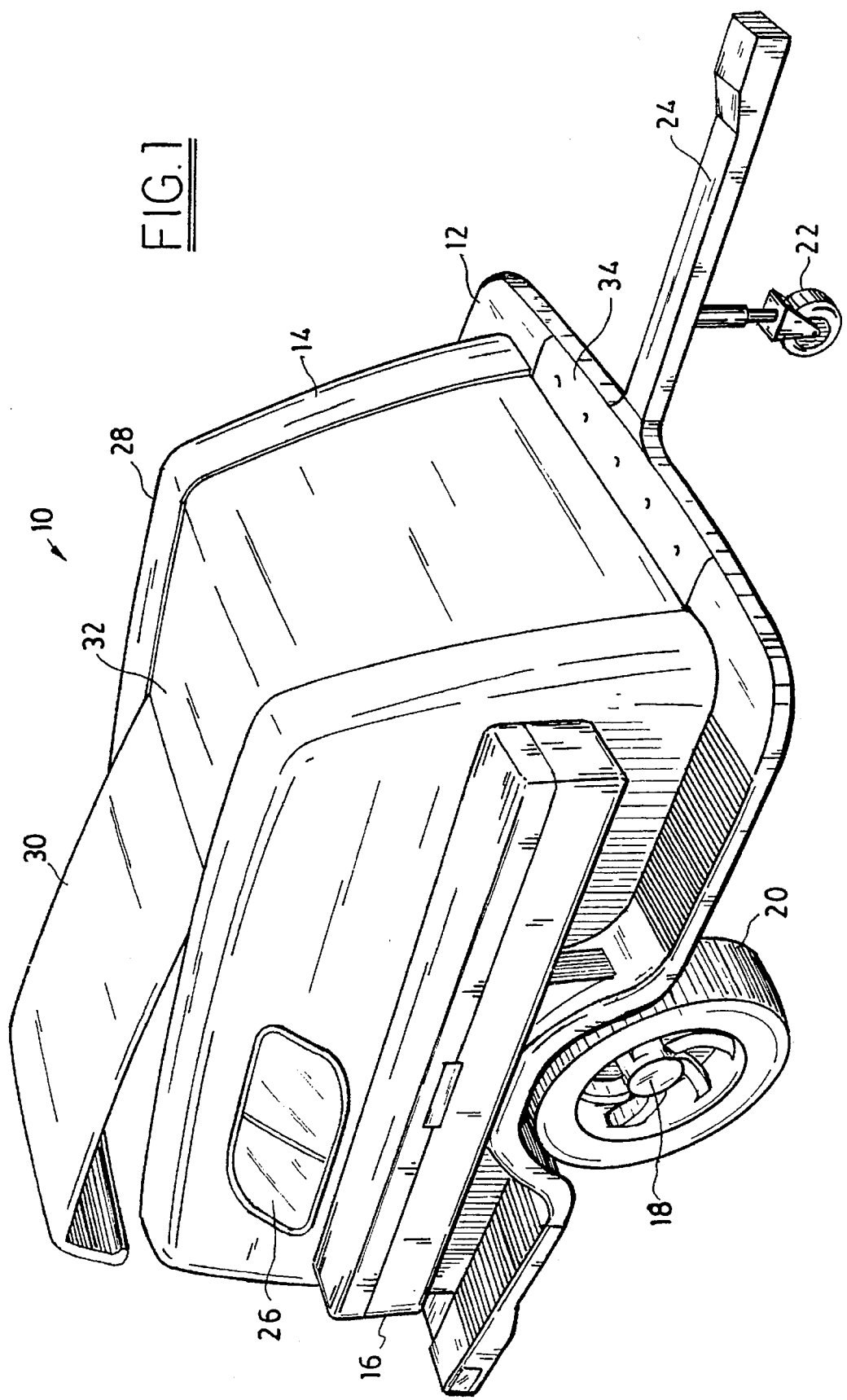
FIG. 1 is a perspective view of one preferred embodiment of preferred embodiment of applicants' trailer system.

One preferred embodiment of the trailer system 10 of this invention is illustrated in FIG. 1. Referring to FIG. 1, which is a perspective view of one of applicants' preferred embodiments, trailer system 10 is comprised of integrally formed frame 12, module 14, accessory box 16, axle 18, wheel assembly 20, wheel assembly 22, and tongue 24.

Applicants' trailer system 10 is comprised of a lightweight trailer. As used in this specification, the term trailer refers to an unmotorized, wheeled vehicle designed to be towed behind a motorized vehicle. Although the trailer may contain at least two axles and at least four wheels, it is preferred that the trailer used in the system 10 of this invention contain only one axle 18.

Referring again to FIG. 1, trailer system 10 is comprised of frame 12. Frame 12 is preferably an integrally molded assembly that preferably consists essentially of or is comprised of reinforced plastic resin material.

The plastic resin material used in the reinforced plastic composite may be either thermoplastic resin or thermoset resin.

In one embodiment, the plastic resin is a thermoplastic. As used in this specification, the term thermoplastic refers to a high polymer that softens when exposed to heat and returns to its original condition when cooled to room temperature. Suitable thermoplastic materials include nylon, thermoplastic polyester, polyurethane prepolymer, polystyrene, acrylic resin, polyetheretherketone, polycarbonate, and the like.

In one preferred embodiment, the thermoplastic resin is a polyamide, often referred to as "nylon". It is preferred that the nylon be selected from the group consisting of nylon 6, nylon 6,6, nylon 6,10, nylon 6,12, and the like. These nylons are well known to those skilled in the art and are described in, e.g., pages 179–188 of Raymond B. Seymour's "Engineering Polymer Sourcebook" (McGraw-Hill Book Company, New York, 1990), the disclosure of which is hereby incorporated by reference into this specification.

In one embodiment, the plastic material in frame 12 is a thermosetting resin. As is known to those skilled in the art, a thermoset material is a plastic that, when cured by the application of heat or other means, is substantially infusible and insoluble. Suitable thermosetting materials include, e.g., the thermosetting materials described on pages 71–76 of Joel Frados' "Plastic Engineering Handbook," Fourth Edition (Van Nostrand Reinhold Company, New York, 1976).

In one preferred embodiment, the thermosetting resin is selected from the group consisting of alkyd resins, acrylic resins, epoxy resins, melamine resins, phenolic resins, polyester resins, ureas, and the like.

In one embodiment, the thermosetting resin is an epoxy resin. As used in this specification, the term epoxy resin refers to a thermosetting resin based on the reactivity of the epoxide group. As is known to those skilled in the art, one type of epoxy resin is made from epichlorohydrin and bisphenol A; aliphatic polyols (such as glycerol) may be used instead of the aromatic bisphenol A. Another type of epoxy resin is made from polyolefins oxidized with peracetic acid. These resins are well known to those skilled in the art and are described, e.g., on page 467 of N. Irving Sax et al.'s "Hawley's Condensed Chemical Dictionary," Eleventh Edition (Van Nostrand Reinhold Company, New York, 1987).

In another embodiment, the thermosetting resin is an unsaturated polyester resin. As is known to those skilled in the art, these resins are cured due to a polymerization reaction that causes cross-linking among the individual linear polymer chains. However, in contrast to the other thermosetting resins, no by-product is formed during the curing reaction and, thus, the resins can be molded, cast, and laminated at low temperatures and pressures.

The preferred unsaturated polyesters are thermoset resins prepared by the condensation polymerization of organic diacids with glycols, followed by solution in the free radical cross-linking with a reactive solvent. By way of illustration and not limitation, some preferred unsaturated polyester resin bases include orthophthalic, isophthalic, terephthalic, bisphenol A, and the like. Some suitable unsaturated diacids used include maleic anhydride, fumaric acid, and the like. Some suitable saturated diacids used include phthalic anhydride, isophthalic acid, adipic acid, axelaic acid, sebacic acid, cholrendic acid, tetrabromphthalic acid, tetracholorphthalic acid, nadic methyl anhydride, and the like. Some suitable glycols used include ethylene glycol, diethylene glycol, propylene glycol, dipropylene glycol, halogenated glycol, bisphenol-A, neopentyl glycol, trimethyl pentanediol, and the like. Some suitable monomers include styrene, methyl methacrylate, vinyl toluene, alphmethyl styrene, divinyl benzene, diallyl phthalate, monochlorostyrene, and the like. These materials, and the unsaturated polyester resins which may be made from them, are described in "Fiber Glass Reinforced Plastics . . . By Design," bulletin F352-R-187 (PPG Industries, Inc., Fiber Glass Products, One PPG Place, Pittsburgh, Pa., 1981).

In another preferred embodiment, the thermoset resin used is a vinylester. As is known to those skilled in the art, vinyl-esters are styrene cross-linked, methacrylate terminated diesters with an epoxy (bisphenol-A or phenolic-novolac) backbone.

Many of the preferred epoxides, unsaturated polyesters, and vinylesters are described in the aforementioned "Engineering Polymer Sourcebook."

In one preferred embodiment, the resin used in the molding process is liquid at room temperature and ambient pressure. This liquid may thereafter be preferably combined during a transfer molding process with a catalyst and then injected through a substrate.

In one embodiment, a reaction injection molding resin may be used in a reinforced reaction injection molding process. In this process, the resin used may be a monomer which is caused to polymerize after it has been contacted with a matrix. Suitable monomers include, e.g., polyols, acrylesterol, and the like.

The trailer system of this invention may be prepared by many processes well known to those skilled in the art. One of the preferred processes for making this system is the liquid transfer molding process. Other preferred processes include blow molding, compression molding, injection molding, and the like.

Liquid transfer molding processes are well known to those skilled in the art. Thus, in these processes, resin is transferred under low pressure through a fibrous reinforcing material (matrix).

In a preferred aspect of the liquid (or resin) transfer molding process, a reinforcing matrix is placed into a cold or heated mold. The reinforcing matrix may consist of fiberglass, carbon, KEVLAR (an aromatic polyamide fiber sold by DuPont de Nemours and Company of Wilmington, Del.), boron fiber, and the like.

In one embodiment, the reinforcing matrix consists essentially of fiber glass. The fiber glass may be in discontinuous bulk form, such as milled fibers, glass flake, and the like. Alternatively, or additionally, the fiber glass may be precombined and, thus, may be in the form of a continuous strand mat, a woven roving, or a three-dimensional construction. Methods of making such structures are well known to those skilled in the art and are described in, e.g., George W. McLellan et al.'s "Glass Engineering Handbook," Third Edition (McGraw-Hill Book Company, New York, 1984).

In one embodiment, the fiberglass mat is formed into a three-dimensional preform prior to its use in the molding process.

In the resin transfer molding process, it is preferred to position the matrix in a mold, clamp the mold halves together, and then pump resin into the mold through self-sealing entry ports. The resin may be pre-catalyzed and mixed with resin/accelerator in a mixing head at the entry port, or catalyst may be metered in at the entry port; resin modifiers and/or color may also be added to the system. In general, the resin fills the mold and develops up to about 40 pounds per square inch of internal pressure while exhausting air through peripheral release vents. Curing of the resin often is accomplished without internal heat, but molds may be cored for heating if an elevated resin/catalyst system is used. The molds may be gel coated, or a thermoformed acrylic liner also may be used.

Figure 7:
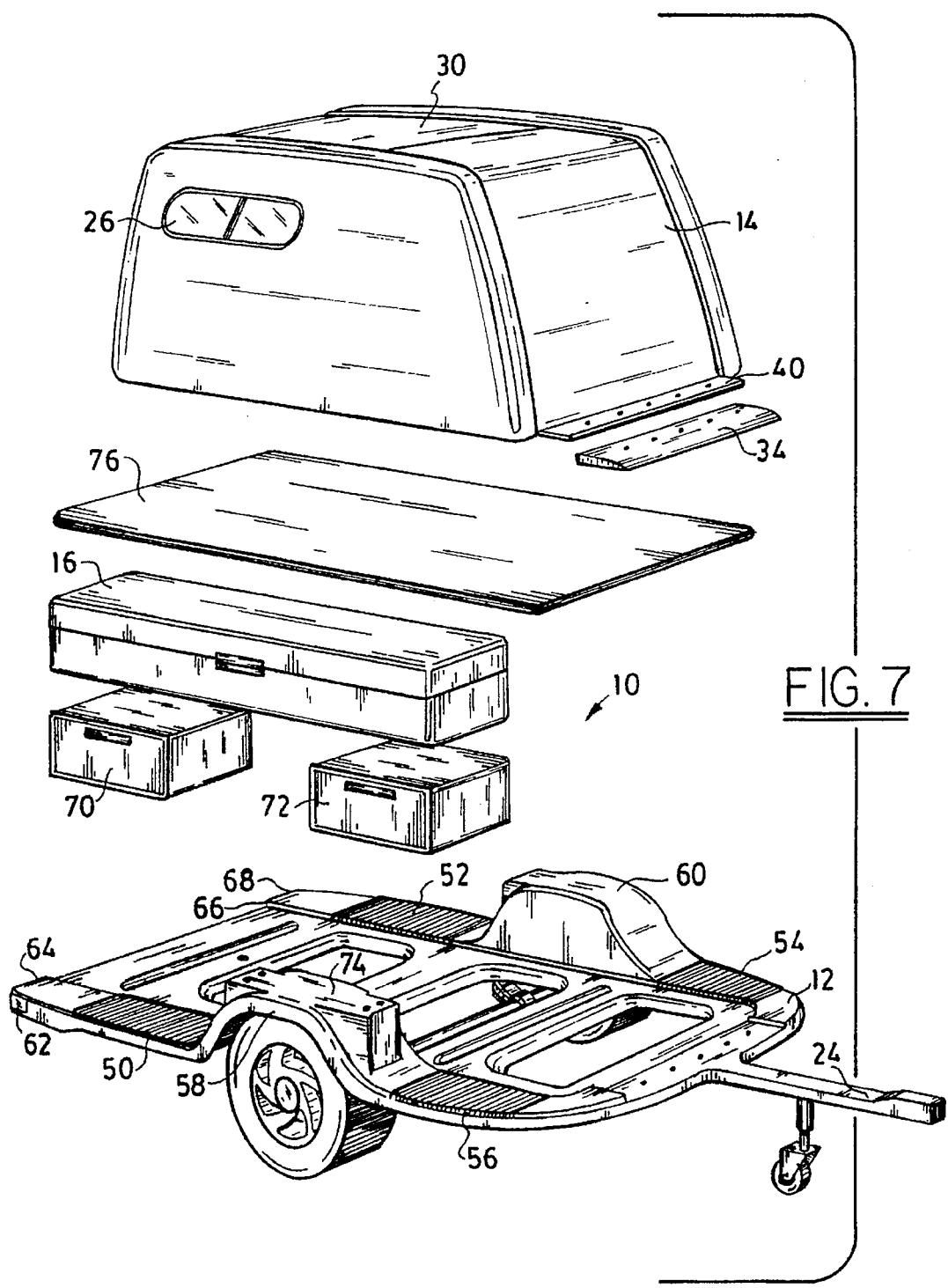
FIG. 7 is an exploded perspective view of the embodiment of FIG. 1.
Figure 8:
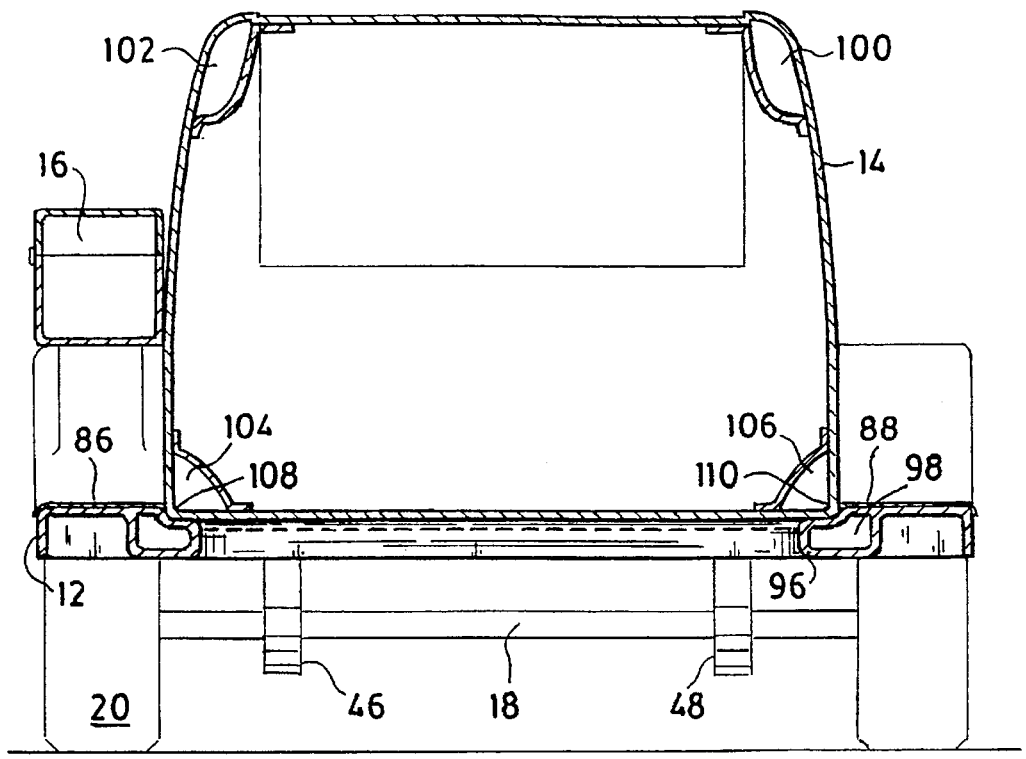
FIG. 8 is a sectional view, taken along lines 8—8 of FIG. 3.

In a preferred embodiment, a molded frame is formed by a resin transfer molding process which contains frame members with a continuous closed section structure. Such a continuous closed section structure is illustrated in FIGS. 7 and 8, in which it can be seen that, e.g., in the preferred embodiment illustrated, frame structural members 86 and 88 are comprised of a perimeter 96 of high-density plastic material and a core 98 of lower density material (such as air).

In one aspect of this preferred embodiment, the continuous closed section structure of the structural frame members of module (pod) 14 is preferably formed from an upper half and a lower half. Each of the upper and lower halves may be formed by the resin transfer molding process described above. Each such half is preferably so shaped that it contains a multiplicity of channels. Once these halves have been so formed, they are adhesively bonded together to form the continuous closed section structure desired.

In another aspect of this preferred embodiment, the continuous closed section structure is formed in one piece with the use of a low-density core or an inflatable core. The matrix is pressed between the core and the mold, and resin is introduced through the matrix. The hardened matrix thus comprises a relatively high density shell surrounding a relatively low-density core.

In either case, in this preferred embodiment, the density of the shell will be substantially greater than the density of the core (which may consist of air or low-density material). In the embodiment where a foam core is used, the density of such core will be from about 1 to about 5 pounds per cubic foot.

In general, the shell material that defines the frame preferably is comprised of from about 40 to about 60 weight percent of reinforcing fiber material and from about 60 to about 40 weight percent of resin.

Referring again to FIG. 1, the trailer system of this invention is comprised of module 14. In the preferred embodiment illustrated in FIG. 1, module 14 is a weather-tight pod which, preferably, comprises fiber-reinforced plastic which may be made by the resin-transfer molding process described above. At least about 90 weight percent of this pod 14 is comprised of non-metallic material selected from the group consisting of fiber-reinforced plastic, glass, elastomeric material (such as rubber), and the like. At least about 75 weight percent of this pod 14 is comprised of fiber-reinforced plastic material.

In the preferred embodiment illustrated in FIG. 1, the pod 14 is preferably comprised of at least one window 26. In this embodiment, there is preferably another window on the pod 14 (not shown) on side 28 of the pod.

The pod 14 is removably attached to frame 12 by, e.g., the preferred means illustrated in FIG. 2. Accessory box 16 is also removably attached to frame 12 by similar means.

The pod 14 illustrated in FIG. 1 also preferably contains a hatch 30 that is hingeably attached to the top 32 of pod 14.

It is preferred that this hatch be comprised of at least about 90 weight percent of fiber-reinforced plastic material.

Referring to FIG. 2, one preferred means is illustrated for attaching pod 14 to frame 12. In this preferred embodiment, pod 14 may be attached to frame 12 by means of plate 34, fastener, 36, and fastener 38.

Frame 12 is adapted to receive the lower portion (not shown) of pod 14 so that said lower portion nests within a mating portion (not shown) of frame 12. Once pod 14 is nested in frame 12, it may be secured to such frame by conventional means. Thus, plate 34 may be placed against a lip 40 on pod 14 and secured by bolting said plate into frame 12 using a molded-in-place receptacle (not shown). Thus, horn 42 of pod 14 may be bolted down into frame 12 using a molded-in-place receptacle (not shown).

FIG. 3 is a left side view of the embodiment of FIG. 1, showing the left side window 44. In the embodiment illustrated in FIG. 3, license plate holding receptacle 47 is integrally molded into frame 12.

Figure 4:
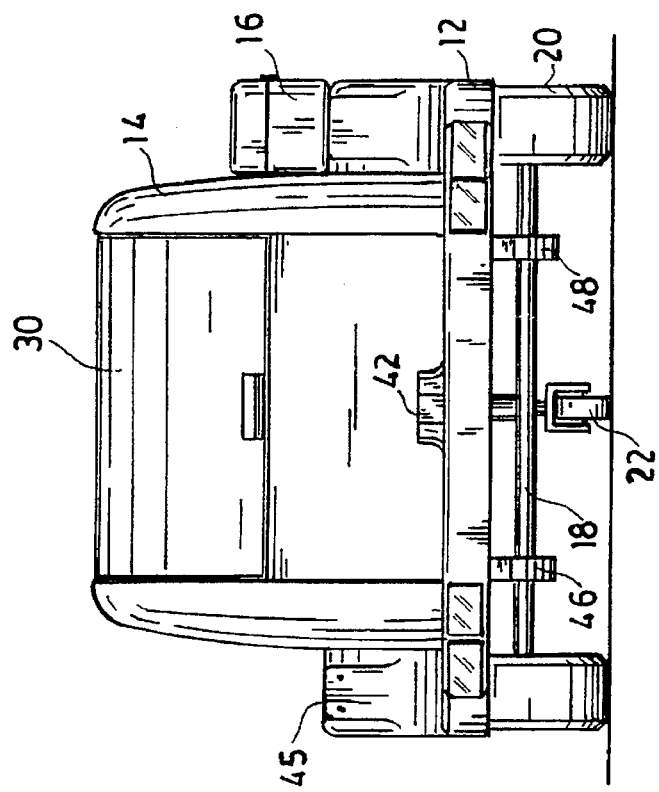
FIG. 4 is a rear view of the embodiment of FIG. 1.

FIG. 4 is a back view of the embodiment of FIG. 1. In the preferred embodiment illustrated in FIG. 4, frame 12 is supported over axle 18 by means 46 and 48 for suspending frame 12 on axle 18.

The suspension means 46, 48 are well known to those skilled in the art and are described, e.g., on pages 2313 through 2317 of Volume 17 of "The Illustrated Science and Invention Encyclopedia," International Edition (H. S. Stuttman, Inc., Westport, Conn., 1983). In one preferred embodiment, suspension means 46 and 48 comprise means for adjusting the height of frame 12. Suspension means for adjusting the height of wheeled vehicles are well known to those skilled in the art. Thus, for example, one may use the "Citroen high pressure oil-gas suspension unit" described on page 2315 of said Illustrated Science and Invention Encyclopedia. Also, one may use an inflatable rubber air bag spring similar to that currently in use on buses and luxury automobiles to maintain desired vehicle ride height.

Figure 5:
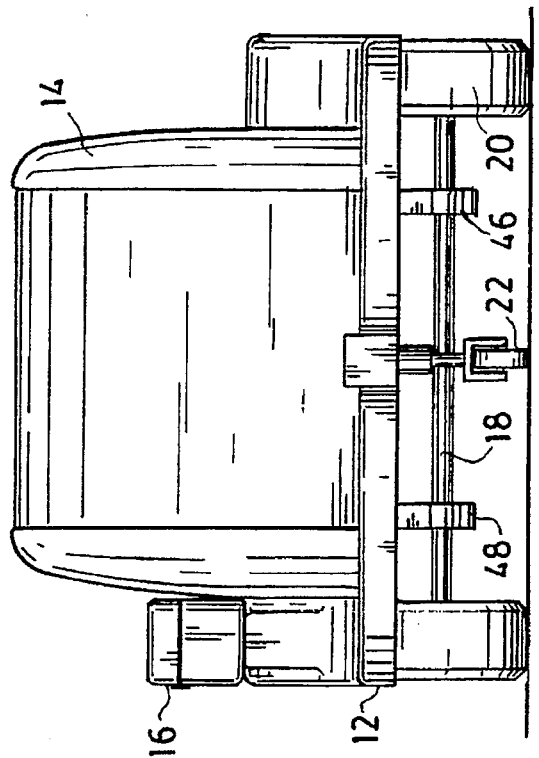
FIG. 5 is a front view of the embodiment of FIG. 1.

FIG. 5 is a front view of the trailer system of FIG. 1. Referring to FIG. 5, it will be seen that wheel assembly 22 imparts stability to the trailer assembly 10 when such assembly 10 is not attached to a vehicle. Such third wheel, which may be adjustable (with an adjustment means, such as a crank, not shown), also aids in hitching and unhitching the trailer assembly 10 from a towing vehicle.

FIG. 6 is a top view of the embodiment of FIG. 1. Referring to FIG. 6, it will be noted that, in this embodiment, tongue 24 is an integral part of frame 12. In another embodiment, not shown, tongue 24 is hingably attached to frame 12 so that frame 12 can be tilted about axle 18 when it is being loaded or unloaded.

FIG. 7 is an exploded illustration of the embodiment of FIG. 1. Referring to FIG. 7, trailer system 10 is comprised of a frame 12 equipped with several preferred features.

Non-skid tread surfaces 50, 52, 54, and 56 are disposed on the left and right sides of frame 12, both in front of and in back of wheel housings 58 and 60. These surfaces may be incorporated into or onto the frame 12 by conventional means. Thus, e.g., they may be molded into frame 12 and made an integral part thereof. Alternatively, or additionally, they may be adhesively secured to frame 12.

The wheel housings 58 and 60, described above, are preferably integrally molded with frame 12 so that such frame exhibits monocoque structural properties.

The preferred trailer system 10 illustrated in FIG. 7 also contains stop, turn, and backup lamps 62, 64, 66, and 68.

In the embodiment illustrated in FIG. 7, storage containers 70 and 72 are adapted to nest against frame 12 and attach to the bottom of accessory box 16. The bottom surfaces (not shown) of these storage containers can (but need not) contact tread surfaces 50 and/or 52 and/or 54 and/or 56.

In this embodiment, frame 12 contains a mounting plateau 74 integrally molded into wheel house 58. This mounting plateau 74 is adapted to support accessory box 16, a portion of whose bottom surface may rest upon and mate with plateau 74. Once accessory box 16 is nested within plateau 74, storage containers 70 and 72 may be attached to the underside of said accessory box.

In one embodiment of applicants' trailer system, illustrated in FIG. 7, a substantially flat, non-skid load floor is provided. This floor is adapted to nest within the confines of frame 12 and to provide a surface to support various freight. It is preferred to use floor 76 or pod 14, but not necessarily both. However, in certain circumstances, one may choose to use both.

FIG. 8 is a cross-sectional view taken along lines 88 of FIG. 3. It illustrates the hollow molded frame structure of applicants' frame 12.

Referring again to FIG. 7, it will be seen that frame 12 is a continuous hollow structure comprised of at least three structural cross-member elements 80, 82, and 84 and two structural longitudinal member elements 86 and 88. Each of said structural elements are continuously connected and integrally molded to one another.

Each of the structural cross-member elements in frame 12, and each of the structural longitudinal member elements in frame 12, has a closed cross-section. Thus, referring to FIG. 8, it will be seen that longitudinal member elements 86 and 88 are comprised of a perimeter 96 of relatively high-stiffness, high-density reinforced plastic material completely surrounding a core 98 of lower density material. The core may be air, foam, or other low-density material. The closed cross-sections of these structural members may define an irregular shape, a circular shape, a square shape, and the like. In one preferred embodiment, in which the structural element(s) is used to facilitate the nesting of one or more modules 14 or floor 76 onto frame 12, it is preferred that the closed cross-section(s) define an irregular shape. Thus, referring again to FIG. 8, pod 14 nests into members 86 and 88; and nesting surfaces 108 and 110 facilitate such nesting. Referring again to FIG. 7, the cross-member elements 80, 82, and 84 also are comprised of a perimeter of relatively high-stiffness, high-density reinforced plastic material completely surrounding a core of lower density material.

The use of an integrally molded structure comprised of a multiplicity of structural members, each of which has a closed cross-section, provides a unique combination of properties for applicants' trailer system 10. Because of such structure, applicants' trailer is lightweight, durable, strong, and buoyant; and the use of substantially inert plastic material renders the system substantially corrosion resistant.

Referring again to FIG. 8, it will be seen that, in the embodiment illustrated in the Figure, pod 14 is comprised of at least two upper longitudinal structural elements 100 and 102 and two lower longitudinal structural elements 104 and 106, at least two upper cross-member elements (not shown), and at least two lower cross-member elements (not shown). In this preferred embodiment, each of the longitudinal and cross-member elements of pod 14 also has a closed cross-section. In this embodiment, pod 14 is a continuous hollow structure comprised of said longitudinal and cross-member elements, each of which are continuously connected and integrally molded to one another.

Thus, it will be appreciated by those skilled in the art that, in the preferred embodiment illustrated in the Figures, there is described a sports trailer system comprised of a first removable module, a second removable module, an integrally molded frame shaped and adapted for the nesting of said first removable module and said second removable module within said integrally molded frame, and a substantially flat floor surface contiguous with said integrally molded frame. In this preferred sports trailer system, (1) the frame is comprised of at least 90 weight percent of nonmetallic material, (2) the frame is an integral, continuous structure comprised of at least three structural cross-member elements and at least two structural longitudinal structural elements, (3) each of such structural elements are continuously connected, (4) each of such structural elements has a closed cross-section defined by a perimeter of nonmetallic material, (5) the frame is comprised of integrally-molded means for attaching at least one of such modules, a first integrally molded wheel well, a second integrally molded wheel well, and an integrally-molded fender, (6) the first removable module is adapted to nest within a portion of the integral frame and is an integrally-molded structure comprised of a first integrally molded wall, a second integrally molded wall, and a floor integrally connected to the first integrally molded wall and the second integrally molded wall, (7) the second removable module is adapted to nest within a portion of the integral frame.

The integrally molded frame 12 is illustrated in FIG. 7. Referring to FIG. 7, it will be clearly seen that such frame 12 is comprised of a first integrally molded wheel well 58, a second integrally molded wheel well 60, an integrally molded fender 61 (also see FIG. 1), integrally molded means for mounting an axle (not shown), integrally molded means for mounting a suspension (not shown), and integrally molded means for mounting a tongue bar 24 (not shown).

Referring again to FIG. 7, and in the preferred embodiment illustrated therein, it will be seen that frame 12 is contiguous with a substantially flat mounting plateau 76 which, in the embodiment illustrated, is a separate structure from frame 12 and nests in it. In another embodiment, not shown, a substantially flat floor surface is provided not by separate structure 76 but by a floor surface integrally formed with frame 12.

FIG. 8 is a sectional view of one preferred pod 14. In the preferred emboidment illustrated in FIG. 8, it will be seen that pod 14 is comprised of a first integrally molded top wall 101, a second integrally molded side wall 103, a third integrally molded side wall 105, and a floor 107 integrally connected to side walls 103 and 105.

Figure 9:
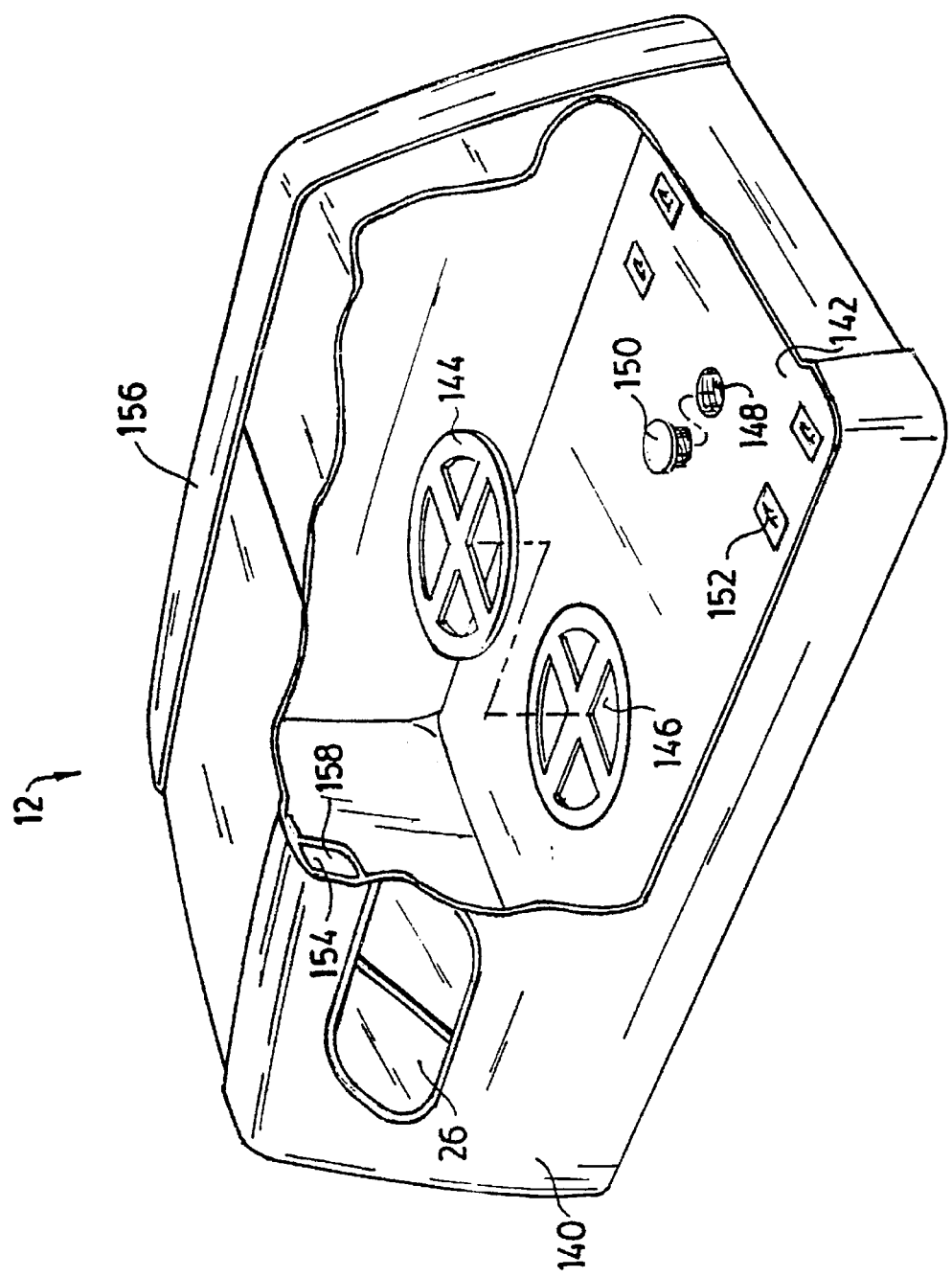
FIG. 9 is a partially broken away perspective view of one preferred embodiment of a module used in the sports system of FIG. 1.

FIG. 9 is a perspective view of one preferred pod 12 in which one of the walls 140 has been partially cut away to show some interior detail. Referring to FIG. 9, it will be seen that the floor 142 of pod 14 is preferably comprised of a hatch 144 covering hatch opening 146. As will be apparent to those skilled in the art, because pod 14 is an integrally formed unit comprised of floor 142, it can be towed over snow and/or water independently of frame 12, and a user can ice fish through open port 146.

Referring again to FIG. 9, and in the preferred embodiment illustrated therein, it will be seen that floor 142 of pod 14 also is comprised of a drain hole 148 which may be sealed by removable drain plug 150. As will be apparent to those skilled in the art, the interior of pod 14 may be washed and the effluent drained through drain hole 148 and/or hatch opening 146.

Referring again to FIG. 9, it will be seen that the interior of pod 14 is comprised of a multiplicity of interior load tie down projections 152 which allow one to secure equipment via rope to one or more of such tie downs 152. Although, for the sake of simplicity of representation, only several of such tie down projections 152 have been shown only on floor 142, it will be apparent to those skilled in the art that such tie-down projections 152 may appear on one or more of walls 140 and/or other one or more of the other interior surfaces of pod 14.

Referring again to FIG. 9, it will be seen that pod 14 is comprised of a multiplicity of structural members 154 and 156. In the preferred embodiment illustrated in FIG. 9, said structural members 154 and 156 preferably have a hollow interior section 158.

The pod 14 of FIG. 9 is useful for ice fishing. It will be apparent to those skilled in the art that other pods with other configurations may be mounted on frame 12 and used for other purposes. Thus, byway of illustration and not limitation, one pod 14 may comprise keels on its bottom surface to facilitate its linear movement over snow and water.

One such pod 14 is illustrated in FIG. 10. Referring to FIG. 10, and in the preferred embodiment illustrated, it will be seen that pod 14 is cormprised of a multiplicity of horizontally-extending keels 162, 164, and 166 on its bottom surface 168 for facilitating the movement in either snow or water of pod 14 in a substantially straight line.

It is to be understood that the aforementioned description is illustrative only and that changes can be made in the apparatus, the ingredients and their proportions, and in the sequence of combinations and process steps as well as in other aspects of the invention discussed therein without departing from the scope of the invention as defined in the following claims.

What is claimed is:

1. A sports trailer system comprised of an integral first removable module, a hatch hingeably attached to said first removable module, a second removable module, an integral frame mean for the nesting of said first removable module and said second removable module within said integral frame, wherein:

(a) said frame is comprised of at least 90 weight percent of nonmetallic material;

(b) said frame is an integral, continuous structure comprised of at least three structural cross-member elements and at least two structural longitudinal elements, wherein:
   1. each of said structural elements are continuously connected, and
   2. each of said structural elements has a closed cross-section defined by a perimeter of nonmetallic material;

(c) said frame is comprised of means for nesting and attaching at least one of said modules, and said frame further comprises a first wheel well, a second wheel well, and a fender;

(d) said first removable module is adapted to nest within a portion of said integral frame and is an integral structure comprised of a first wall, a second wall, a third wall, and a fourth wall, wherein:
   1. said first wall forms a first intersection with said second wall, and a first hollow beam is integrally formed at said first intersection,
   2. said second wall forms a second intersection with said third wall, and a second hollow beam is integrally formed at said second intersection,
   3. said third wall forms a third intersection with said fourth wall, and a third hollow beam is integrally formed at said third intersection, and
   4. said fourth wall forms a fourth intersection with said first wall, and a fourth hollow beam is integrally formed at said fourth intersection, and (e) said second removable module is adapted to nest within a portion of said integral frame.

2. The sports trailer system as recited in claim 1, wherein said first removable module is comprised of a first window.

3. The sports trailer system as recited in claim 2, wherein said first removable module is comprised of a second window.

4. The sports trailer system as recited in claim 1, wherein each of said structural elements has a cross-sectional shape removably connected to at least one of said first removable module and said second removable module.

5. The sports trailer system as recited in claim 1, wherein one of said modules is a pod, and at least about 90 weight percent of said pod is comprised of nonmetallic material.

6. The sports trailer system as recited in claim 2, wherein said nonmetallic material is plastic.

7. The sports trailer system as recited in claim 1, wherein said first module is removably attached to said integral frame.

8. The sports trailer system as recited in claim 1, wherein said integral frame is comprised of suspension means attached to said frame.

9. The sports trailer system as recited in claim 1, wherein said integral frame is attached to a first wheel, a second wheel, and a third wheel.

10. The sports trailer system as recited in claim 1, wherein said first module is comprised of a bottom surface and, integrally formed therein, a first keel, a second keel, and a third keel.

11. The sports trailer system as recited in claim 1, wherein said first module is comprised of a bottom surface and a hatch opening.

12. The sports trailer system as recited in claim 1, wherein said first module is comprised of a bottom surface and, extending upwardly from said surface through said floor of said first module, a drain opening.

13. The sports trailer system as recited in claim 1, wherein said integral frame is comprised of a multiplicity of non-skid surfaces.

14. The sports trailer system as recited in claim 1, wherein said second removable module is an accessory box.

15. The sports trailer system as recited in claim 1, wherein said floor of said first module is comprised of a multiplicity of interior load tie down members.

* * * * *

UNITED STATES PATENT AND TRADEMARK OFFICE
CERTIFICATE OF CORRECTION

PATENT NO. : 5,653,494
DATED      : August 5, 1997
INVENTOR(S): Christopher C. Cleall and Edmund K. Maier It is certified that error appears in the above-identified patent and that said Letters Patent is hereby corrected as shown below:

Cover Page: Section 75, Inventors, Line 2: Replace "Switzerland" with --- Saskatchewan ---

Signed and Sealed this

Thirteenth Day of January, 1998

Attest:

Attesting Officer

BRUCE LEHMAN

Commissioner of Patents and Trademarks